(12) United States Patent
Kim et al.

(10) Patent No.: US 9,947,263 B2
(45) Date of Patent: Apr. 17, 2018

(54) DISPLAY APPARATUS AND CONTROL METHOD FOR THE SAME

(71) Applicant: SAMSUNG ELECTRONICS CO., LTD., Suwon-si (KR)

(72) Inventors: Kwang Youn Kim, Suwon-si (KR); Joon Seok Ahn, Suwon-si (KR); Seok Woo Yong, Seoul (KR); Jun-mo Yoo, Yongin-si (KR); Jung Hwa Choi, Pyeongtaek-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/167,194

(22) Filed: May 27, 2016

(65) Prior Publication Data

US 2017/0124937 A1 May 4, 2017

(30) Foreign Application Priority Data

Nov. 4, 2015 (KR) .................. 10-2015-0154689

(51) Int. Cl.
| | |
|---|---|
| *G09G 5/00* | (2006.01) |
| *G09G 3/20* | (2006.01) |
| *G09F 9/30* | (2006.01) |
| *G09G 3/00* | (2006.01) |
| *G06F 1/16* | (2006.01) |

(52) U.S. Cl.
CPC ......... *G09G 3/2096* (2013.01); *G06F 1/1601* (2013.01); *G09F 9/301* (2013.01); *G09G 3/001* (2013.01); *G06F 1/1652* (2013.01); *G06F 2200/1612* (2013.01); *G09G 2320/0613* (2013.01); *G09G 2320/08* (2013.01); *G09G 2340/0442* (2013.01); *G09G 2380/02* (2013.01)

(58) Field of Classification Search
None
See application file for complete search history.

(56) References Cited

U.S. PATENT DOCUMENTS

| | | | |
|---|---|---|---|
| 2009/0249247 A1 | 10/2009 | Tseng et al. | |
| 2013/0321740 A1 | 12/2013 | An et al. | |
| | (Continued) | | |

FOREIGN PATENT DOCUMENTS

| | | |
|---|---|---|
| EP | 2892045 A1 | 7/2015 |
| EP | 2927740 A1 | 10/2015 |
| | (Continued) | |

OTHER PUBLICATIONS

Communication dated Nov. 21, 2016 issued by the Korean Intellectual Property Office in counterpart Korean Patent Application No. 10-2015-0154689.
Communication dated Oct. 31, 2016 issued by the European Patent Office in counterpart European Patent Application No. 16172258.2.
Communication dated Jul. 28, 2016, issued by the European Patent Office in counterpart European Application No. 16172258.2.

(Continued)

*Primary Examiner* — Martin Mushambo
(74) *Attorney, Agent, or Firm* — Sughrue Mion, PLLC

(57) ABSTRACT

A display apparatus capable of controlling a curvature of a viewing area in which a broadcast image is displayed and a curvature of an area except the viewing area to be different from each other, and a control method of the same. A display apparatus includes a display; and a driving device configured to change a curvature of the display, wherein the driving device may control a curvature of a viewing area and a curvature of a background area to be different from each other.

20 Claims, 19 Drawing Sheets

(56) References Cited

U.S. PATENT DOCUMENTS

| | | | |
|---|---|---|---|
| 2014/0035869 A1* | 2/2014 | Yun | G06F 3/0414 |
| | | | 345/174 |
| 2014/0062856 A1 | 3/2014 | Lu et al. | |
| 2014/0068689 A1 | 3/2014 | Sirpal et al. | |
| 2015/0035812 A1 | 2/2015 | Shin et al. | |
| 2015/0145837 A1* | 5/2015 | Park | H04N 5/64 |
| | | | 345/184 |
| 2015/0185761 A1* | 7/2015 | Song | G06F 1/1601 |
| | | | 361/679.21 |
| 2015/0187325 A1 | 7/2015 | Yeo et al. | |
| 2015/0277131 A1 | 10/2015 | Park et al. | |

FOREIGN PATENT DOCUMENTS

| | | |
|---|---|---|
| KR | 10-2009-0121504 A | 11/2009 |
| KR | 10-2015-0080837 A | 7/2015 |

OTHER PUBLICATIONS

International Search Report (PCT/ISA/210) dated Oct. 6, 2016, issued by International Searching Authority in counterpart International Application No. PCT/KR2016/006291.
Communication dated May 25, 2017 by the Korean Intellectual Property Office in counterpart Korean Patent Application No. 10-2015-0154689.
Communication dated Aug. 3, 2017 by the European Patent Office in counterpart European Patent Application No. 16172258.2.

* cited by examiner

DISPLAY APPARATUS AND CONTROL METHOD FOR THE SAME

CROSS-REFERENCE TO RELATED APPLICATION(S)

This application claims priority from Korean Patent Application No. 10-2015-0154689, filed on Nov. 4, 2015 in the Korean Intellectual Property Office, the disclosure of which is incorporated herein by reference in its entirety.

BACKGROUND

1. Field

Apparatuses and methods consistent with exemplary embodiments relate to a display apparatus for displaying an image and a control method for the same.

2. Description of the Related Art

A display apparatus includes a display panel in which an image is displayed. For example, the display apparatus may include a television (TV) or a monitor.

The display apparatus may be provided with a flat display panel. Recently, however, a display apparatus with a curved display panel has been developed.

With a display apparatus having a curved display panel, a user may feel a three dimensional effect from a two dimensional image. In addition, the display apparatus displays an image via the curved display panel so that a user may feel more immersed in the image.

SUMMARY

According to an aspect of one or more exemplary embodiments, there is provided a display apparatus capable of allowing a curvature of a viewing area in which a broadcast image is displayed and a curvature of an area except the viewing area to be different from each other, and a control method of the same.

Additional aspects of the disclosure will be set forth in the description which follows and, in part, will be apparent from the description, or may be learned by practice.

According to an aspect of an exemplary embodiment, there is provided a display apparatus including a display; and a driving device configured to change a curvature of the display, wherein the driving device controls a curvature of a viewing area of the display to be different than a curvature of a background area of the display.

The driving device may be further configured to maintain the viewing area of the display in the curved state and transform the background area into a flat state.

The driving device may be further configured to transform the viewing area of the display into the curved state and maintain the background area in a flat state.

The driving device may be further configured to change the curvature of the display so that the curvature of the background area of the display is less than the curvature of the viewing area.

The driving device may be further configured to change the curvature of the display to enable a curvature of an information area to be less than the curvature of the viewing area when the information area is formed in the background area of the display.

The display apparatus may include an input interface configured to input a command to generate an information area in the background of the display, wherein the driving device may be further configured to, in response to a command to generate the information area being input, change the curvature of the display to so that the curvature of the background area is less than the curvature of the viewing area.

The driving device may be further configured to, in response to an image displayed in the viewing area having an aspect ratio different from an aspect ratio of the display apparatus, change the curvature of the display so that the curvature of the background area of the display is less than the curvature of the viewing area.

The background area of the display may be provided on at least one side of the viewing area.

The driving device may include: a first driving device configured to change the curvature of the viewing area of the display; and at least one second driving device configured to change a curvature of an information area of the display.

The first driving device may include: a first base member provided in a rear side of the viewing area of the display; a first driver provided in the first base member and configured to generate a driving force; a plurality of movement members configured to be moved in opposite directions by the first driver; and a plurality of rotation members configured to be rotated by the movement members and to move opposite sides of the viewing area in a first direction and a second direction.

The at least one second driving device may include: a second base member provided in a rear side of the information area of the display; a second driver configured to generate a driving force to move the second base member; and a rotation member provided in the second base member and configured to be rotated by the second driver and to move one side of the information area in a first direction and a second direction.

According to an aspect of an exemplary embodiment, there is provided a control method of a display apparatus, the control method including: transforming a viewing area of a display into a curved state; and transforming an information area so that a curvature of the information area of the display is less than a curvature of the viewing area.

The transforming the viewing area into the curved state may include receiving an input to transform the display into a curved state and transforming the viewing area of the display into the curved state according to the received input.

The control method may further include receiving an input to generate an information area in the display.

The transforming the viewing area into the curved state may include transforming the viewing area of the display into the curved state in response to the input to generate the information area being received.

The transforming the information area may include transforming the information area of the display into a flat state in response to the input to generate the information area being received.

The transforming the information area may include transforming the information area of the display into a flat state.

The control method may include displaying an image in the viewing area having an aspect ratio that is different from an aspect ratio of the display apparatus.

The transforming the viewing area into the curved state may include transforming the viewing area of the display into the curved state in response to an image being displayed in the viewing area having an aspect ratio that is different from an aspect ratio of the display apparatus.

The transforming the information area may include transforming the information area of the display into a flat state in response to an image being displayed in the viewing area having an aspect ratio that is different than an aspect ratio of the display apparatus.

According to an aspect of an exemplary embodiment, there is provided a display apparatus including: a display including a viewing area having a first curvature and an information area having a second curvature; and a driving device configured to control the first curvature to be different than the second curvature in response to a predetermined condition.

The predetermined condition may include an input of a command to generate an information area.

The driving device may be further configured to, in response to the input of the command to generate the information area, transform the first curvature to a nonzero curvature and the second curvature to a zero curvature.

The display apparatus may include a hinge member configured to connect the viewing area of the display to the information area of the display.

The display apparatus may include a second driving device configured to control the hinge member to change the first curvature and the second curvature.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Reference will now be made in detail to one or more exemplary embodiments, examples of which are illustrated in the accompanying drawings.

Figure 1A:
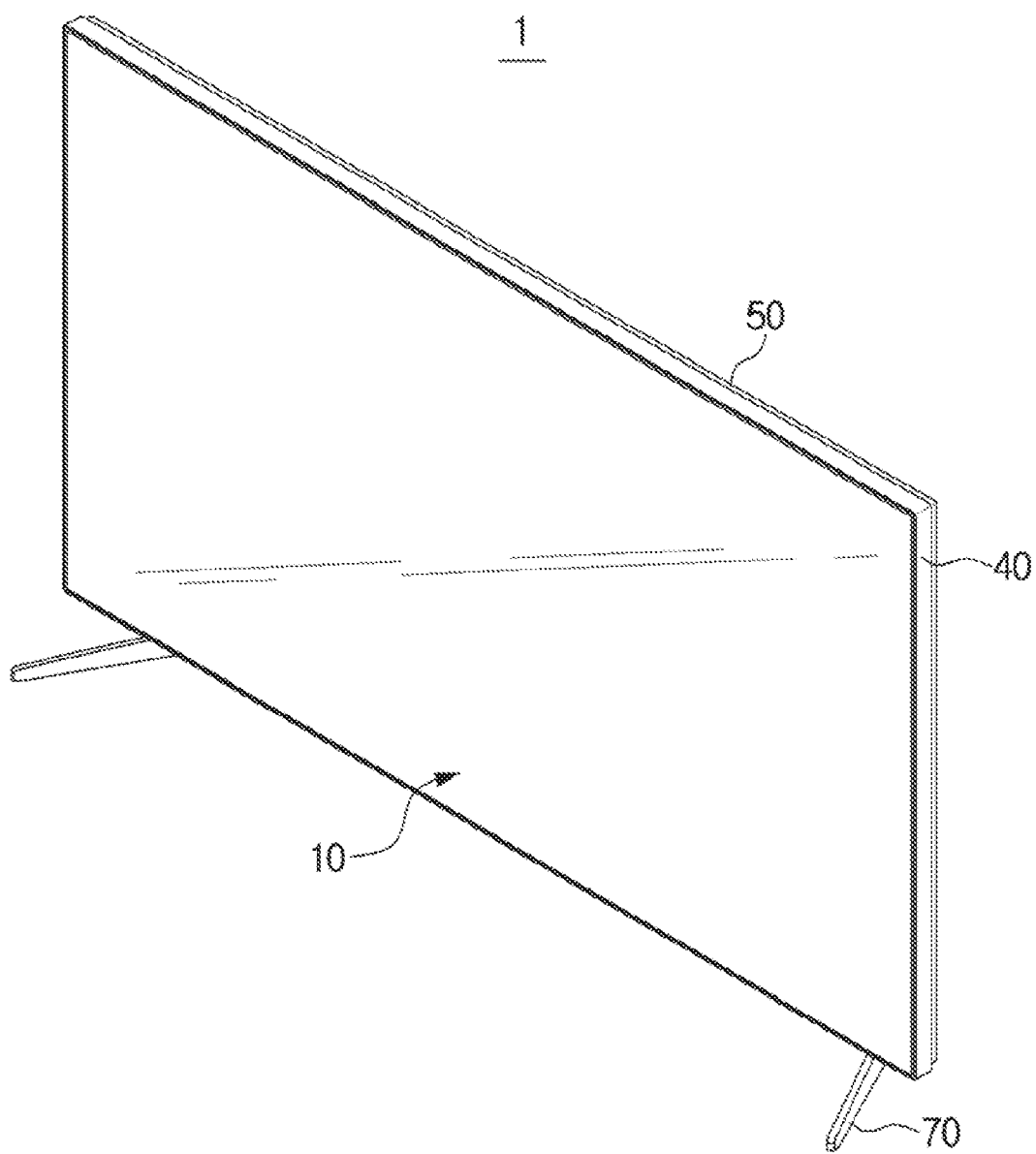
FIG. 1A is a perspective view illustrating a display apparatus in a flat state according to an exemplary embodiment.
Figure 1B:
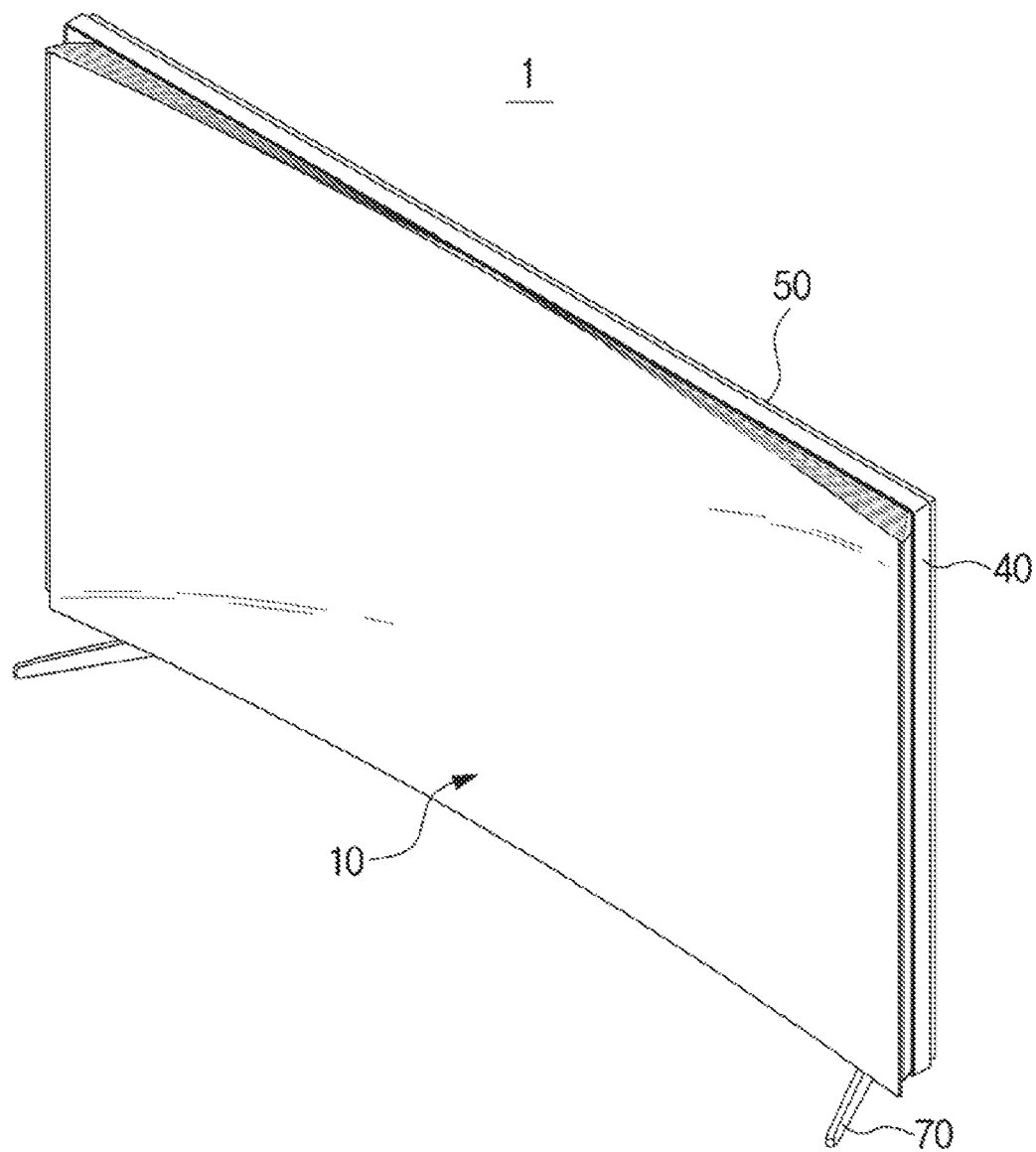
FIG. 1B is a perspective view illustrating a display apparatus in a curved state according to an exemplary embodiment.
Figure 1C:
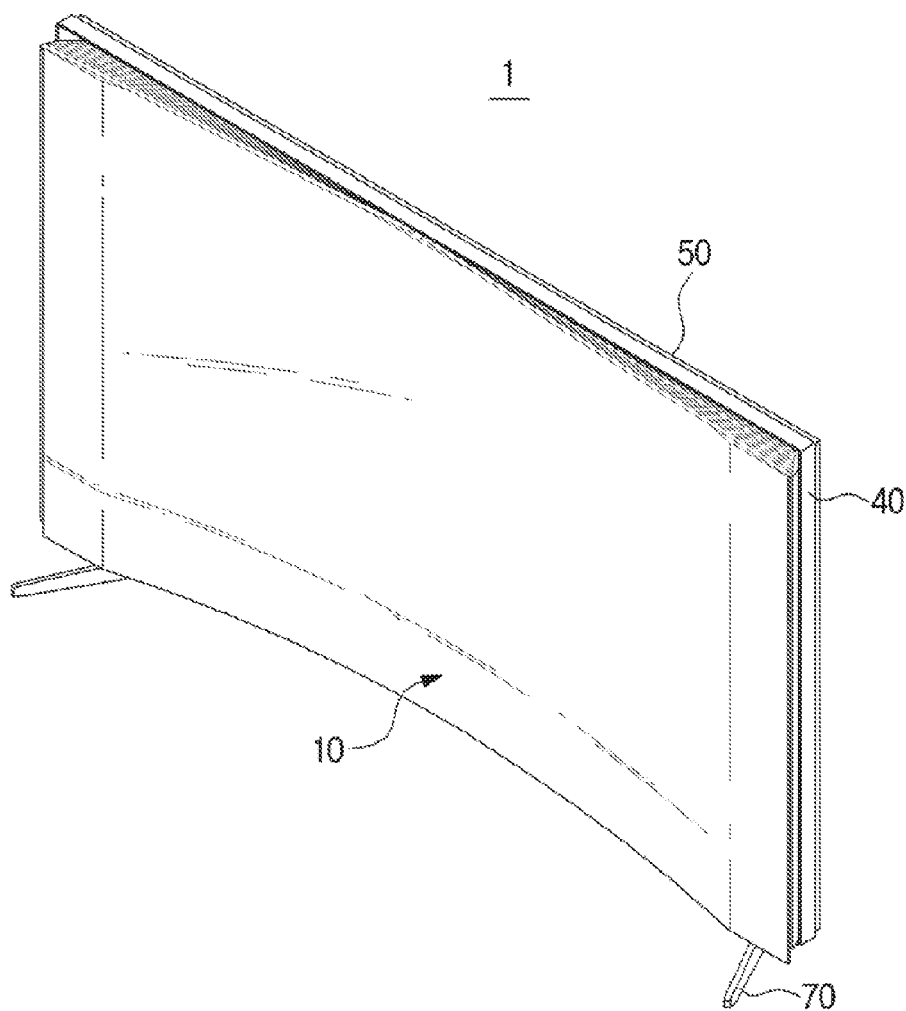
FIG. 1C is a perspective view illustrating a case in which a certain area of a display apparatus is in a curved state and the remaining area is in a flat state of a display apparatus according to an exemplary embodiment.
Figure 2A:
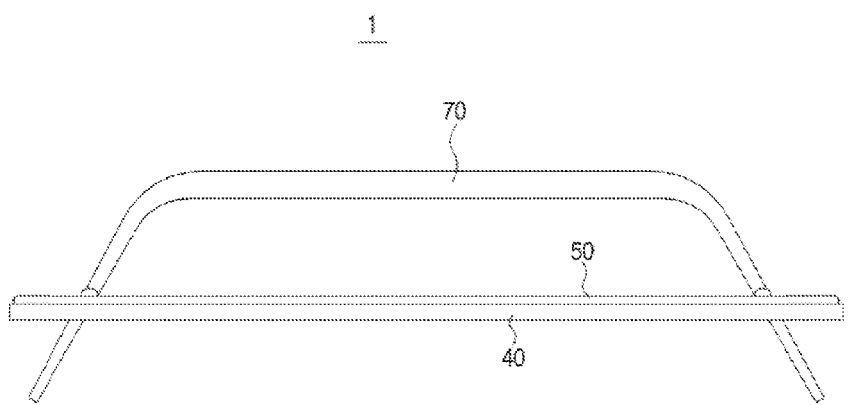
FIG. 2A is a plane view illustrating a display apparatus in a flat state according to an exemplary embodiment.
Figure 2B:
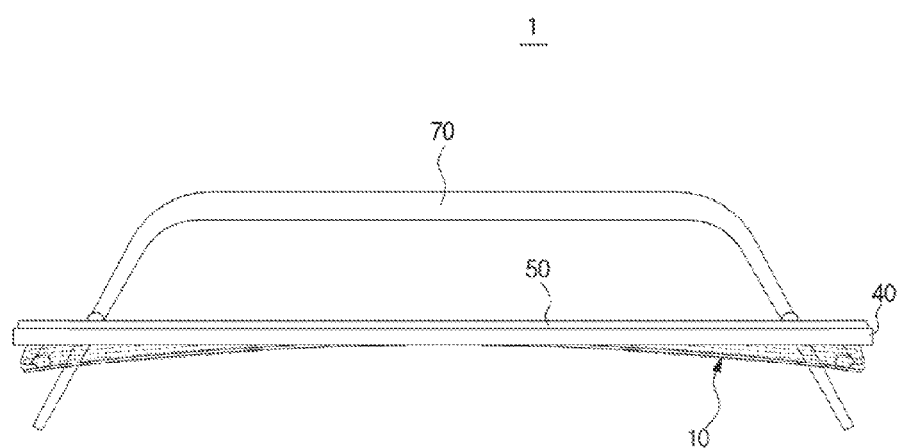
FIG. 2B is a plane view illustrating a display apparatus in a curved state according to an exemplary embodiment.
Figure 2C:
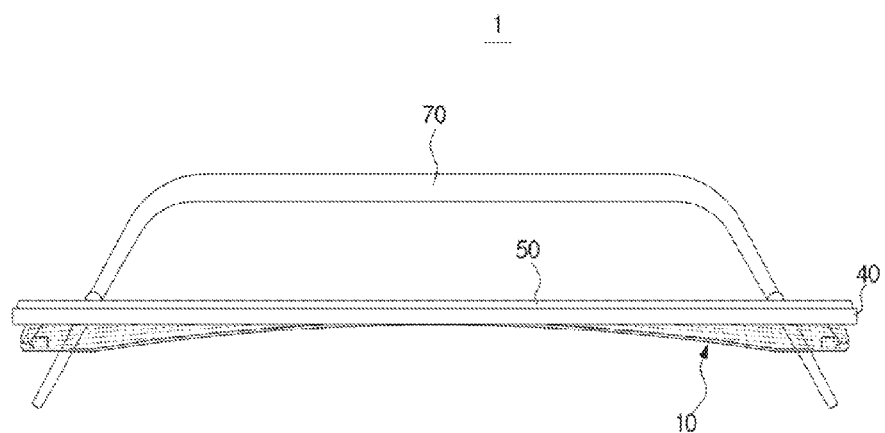
FIG. 2C is a plane view illustrating a case a certain area of a display apparatus is in a curved state and the remaining is in a flat state of a display apparatus according to an exemplary embodiment.

FIG. 1A is a perspective view illustrating a display apparatus in a flat state according to an exemplary embodiment, FIG. 1B is a perspective view illustrating a display apparatus in a curved state according to an exemplary embodiment, and FIG. 1C is a perspective view illustrating a case in which a certain area of a display apparatus is in a curved state and the remaining is in a flat state of a display apparatus according to an exemplary embodiment. FIG. 2A is a plane view illustrating a display apparatus in a flat state according to an exemplary embodiment, FIG. 2B is a plane view illustrating a display apparatus in a curved state according to an exemplary embodiment, and FIG. 2C is a plane view illustrating a case in which a certain area of a display apparatus is in a curved state and the remaining area is in a flat state of a display apparatus according to an exemplary embodiment.

According to an exemplary embodiment, as illustrated in FIG. 1A, a display apparatus 1 may include a display 10 composed of a display panel and a supporting panel, a side case 40 forming a side surface of the display apparatus 1, a rear case 50 forming a rear surface of the display apparatus 1, and a stand 70 detachably installed in the rear case 50 to hold the display apparatus 1 to stand upright.

According to an exemplary embodiment, a display apparatus 1 may be fixed to a wall through a wall mounting bracket that is installed in the wall. The wall mounting bracket may be detachably installed in a rear case.

The display 10 may include a self-emitting type display element, e.g., Organic Light Emitting Diode (OLED), configured to emit light by electrically exciting fluorescent organic compounds or a light receiving type display element, e.g., Liquid Crystal Display (LCD), that needs an additional light source.

Referring to FIGS. 1A and 2A, according to an exemplary embodiment, the display 10 of the display apparatus 1 may be provided in a flat state. A flat state may represent that a curvature of the display 10 is 0 (zero).

As illustrated in FIGS. 1B and 2B, the display 10 in the flat state may be transformable to a curved state in which opposite side portions of the display 10 are protruded toward the front relative to the center portion of the display 10. A curved state may represent that a curvature of the display 10 is not 0 (zero). The display 10 in the curved state may provide an image having an improved immersive sense and a three-dimensional effect to a user.

A high immersive sense provided by the display 10 in the curved state may cause viewing interference when an image is displayed on a certain area without being displayed over the entire area of the display 10. For example, when a broadcast image is displayed on a certain area of the display 10 (e.g., a viewing area) and when additional information related to a broadcast image and other general information, e.g., a mail alarm and SNS information, is displayed on a remaining area (e.g., an information area), the additional information as well as the broadcast image may be recognized by a user. In this case, the information area may interrupt the viewing. Accordingly, when a user views a display in the curved state, the immersive sense may be increased compared to viewing in the flat state, and thus, the information area may interrupt the viewing.

When an image having an aspect ratio different from an aspect ratio of the display 10 is displayed on the display 10, an area (e.g., a background area) outside the viewing area may be displayed in black. For example, when an aspect ratio of the display 10 is 21:9 and an aspect ratio of a displayed image is 16:9, a background area having a ratio of 5:9 in which an image is not displayed may be formed in one side of the viewing area, or a background area having a ratio of 2.5:9 in which an image is not displayed may be formed on opposite sides of the viewing area according to the location of the viewing area. In this case, the black background area may interrupt the viewing. Accordingly, when a user performs viewing in the curved state, the immersive sense may be increased compared to viewing in the flat state, and thus, the information area may interrupt the viewing.

According to an exemplary embodiment, the display apparatus 1 may enable a curvature of a viewing area and a curvature of a background area or an information area to be different from each other so that the background area or the information area is prevented from interrupting the immersive sense of the user. For example, according to an exemplary embodiment, the display apparatus 1 may transform a viewing area into a curved state to maintain an immersive sense of the viewing area, and transform the background area or the information area into the flat state to prevent the background area or the information area from interrupting the viewing of the viewing area.

As illustrated in FIGS. 1C and 2C, according to an exemplary embodiment, the display apparatus 1 may transform the viewing area of the display 10 into the curved state and may transform the background area or the information area, which is provided in opposite sides of the viewing area, into the flat state.

A case in which the background area or the information area is transformed into the flat state is an example. The background area or the information area may be transformed into a curved state having less curvature than that of the viewing area. That is, as long as it does not interfere with the viewing of the viewing area, the background area or the information area may be transformed into a flat state or a curved state having less curvature than that of the viewing area. FIGS. 1C and 2C illustrate that the background area or the information area is disposed on opposite sides of the viewing area, but is not limited thereto. Therefore, the background area and/or the information area may be disposed on any one side of the viewing area. Below, a method of transforming a background area or an information area into a state having less curvature than that of a viewing area and a configuration for the method will be described in detail with reference to the drawings.

Figure 3A:
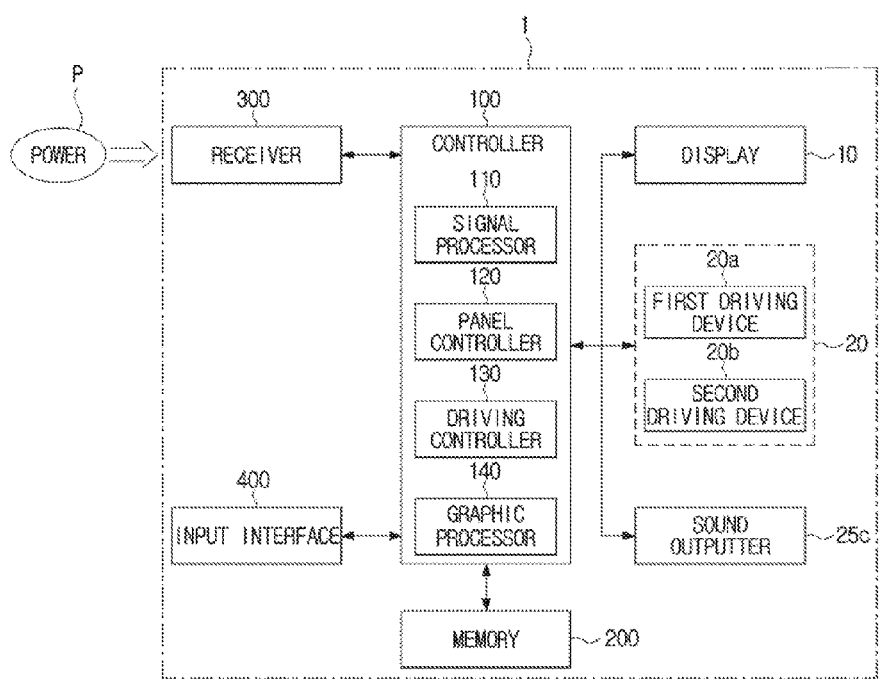
FIGS. 3A and 3B are control block diagrams illustrating a display apparatus according to an exemplary embodiment.
Figure 3B:
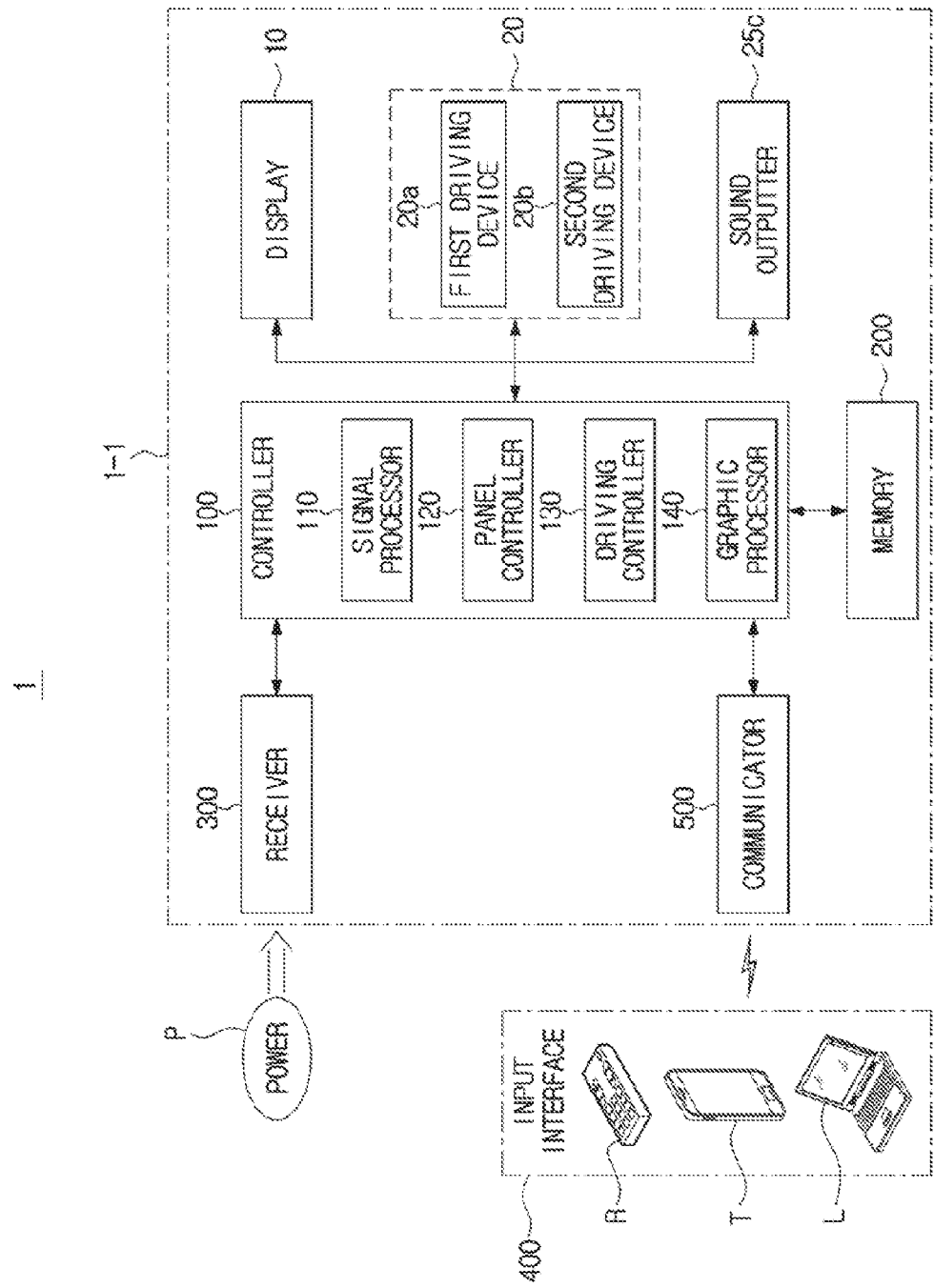

FIGS. 3A and 3B are control block diagrams illustrating a display apparatus according to an exemplary embodiment.

As illustrated in FIG. 3A, according to an exemplary embodiment, the display apparatus 1 may include a receiver 300; a display 10; a sound output unit 25c (e.g., sound outputter); an input unit 400 (e.g., input interface); a memory 200; and a controller 100.

The receiver 300 may receive a broadcast signal. A broadcast signal received via the receiver 300 may become the basis of a broadcast image displayed on the display 10. In order to display a broadcast image, the receiver 300 may include a tuner configured to tune a channel and a demodulation unit configured to demodulate a broadcast signal that is received via a tuned channel.

The tuner may select a Radio Frequency (RF) broadcast signal corresponding to a predetermined channel from a RF broadcast signal received via an antenna. In addition, the tuner may convert a selected RF broadcast signal into an intermediate frequency signal or a baseband video or an audio signal. The demodulation unit may perform demodulating a signal that is converted by the tuner. As a result of that, the demodulation unit may output a stream signal. A stream signal may be a signal in which a video signals, an audio signals or a data signal is multiplexed.

The receiver 300 may receive an external video signal, an external sound signal, and/or an external information signal. The external video signal, the external sound signal, and/or the external information signal may include a signal that is the basis of an image excluding a broadcast image.

The receiver 300 may further include a network interface and an external device interface. The receiver 300 may receive an external signal from the outside via the network interface and the external device interface, and may transmit the external signal to the controller 100. The network interface may connect the display apparatus 1 to a wired and/or wireless network including Internet network. The network interface may be provided with an Ethernet terminal for accessing the wired network. In addition, the network interface may use at least one of Wireless LAN (WLAN), Wi-Fi, Wireless Broadband (Wibro), World Interoperability for Microwave Access (Wimax), and High Speed Downlink Packet Access (HSDPA) for accessing the wireless network.

The external device interface may allow an external device to access to the display apparatus 1. The external device interface may access an external device, e.g., Digital Versatile Disk (DVD), Blu-Ray, gaming device, camera, camcorder, and computer, via a wired and/or wireless method. The external device interface may receive an external signal from an external device and may transmit the external signal to the controller 100.

As illustrated in FIGS. 3A and 3B, the controller 100 may include a signal processor 110; a panel controller 120; a driving controller 130; and a graphic processor 140. The processor may be implemented by an integrated circuit in the microprocessor or software, e.g., firmware, and may be implemented by an additional chip configured to perform the above-mentioned respective function.

The controller 100 may include the signal processor 110 configured to demultiplex a stream signal received from the receiver 300 or to process a demultiplexed signal. As a result of that, the controller 100 may generate an image signal capable of being displayed by the display 10 or a sound signal capable of being outputted by the sound output unit 25c.

The display 10 may receive an image signal that is signal-processed by the controller 100 and output a broadcast image, and the sound output unit 25c may receive a sound signal that is signal-processed by the controller 100 and output a sound. The display 10 may output a broadcast image according to the control of the panel controller 120, which is one component of the controller 100.

The controller 100 may control the display 10 so that the display 10 generates a graphic and text by itself and display the graphic and the text other than a signal received from the outside. The controller 100 may include the graphic processor 140 configured to generate an OSD signal to display a variety of information in a graphic or a text manner. The graphic processor 140 may generate an OSD signal to control the display 10 so that the display 10 displays a variety of information related to the display apparatus 1, a variety of information related to an external device connected to the display apparatus 1, a user interface for the set of the display apparatus 1, a variety of menu screens, a widget, and an icon.

For example, the graphic processor 140 may generate an OSD signal including information of the display apparatus 1, e.g., a currently displayed channel or a sound volume, and may generate an OSD signal to display a basic setting window for a basic setting of the display apparatus 1, and a curvature transformation setting window for a curvature transformation of the display 10.

The controller 100 may control an overall operation of the display apparatus 1. For example, the controller 100 may control a power state (P) of the display apparatus 1 to be turned on and turned off, and may control the output of images and sound. In addition, the controller 100 may control the variation of the curvature of the display 10 so that the display 10 may be transformed into a curved state or a flat state.

The controller 100 may generate a control signal according to an internal calculation, and may transmit the generated control signal to each component of the display apparatus 1. In addition, the controller 100 may generate a control signal according to a user's control command input via the controller 100, and may control an operation of the display apparatus 1 by using the control signal.

The input unit 400 (e.g., input interface) may receive a control command related to the operation of the display apparatus 1 from the user. The input unit 400 may be included in the display apparatus 1, as illustrated in FIG. 3A.

As illustrated in FIG. 3B, the input unit 400 may communicate with a body 1-1, in which the above-mentioned receiver 300, controller 100, storage 200, display 10, driving device 20 and sound output unit 25c are provided, via a wireless method. The body 1-1 may further include a communication unit 500 (e.g., communicator) configured to communicate with the input unit 400.

As illustrated in FIG. 3B, when the input unit 400 is set up to communicate with the body 1-1, the input unit 400 may be implemented by a remote controller (R) configured to communicate with the body 1-1 by using infrared light. In addition, the input unit 400 may be implemented by a device configured to access to a network, e.g., a smart phone (T) or a lap top (L), to communicate with the communication unit 500 of the body 1-1 by accessing a network that is the same as that of the communication unit 500 of the body 1-1.

The input unit 400 may be implemented by a single device or a plurality of devices that are different from each other. For example, the input unit 400 may be implemented by a remote controller (R) or a smart phone (T).

The input unit 400 may be implemented by an additional device provided in the inside of the body 1-1 and configured to communicate with the body 1-1 via the wireless method. For example, the input unit 400 may be implemented by a button together with a remote controller (R), wherein the button is installed in the body and the remote controller (R) communicates with the body.

Figure 4:
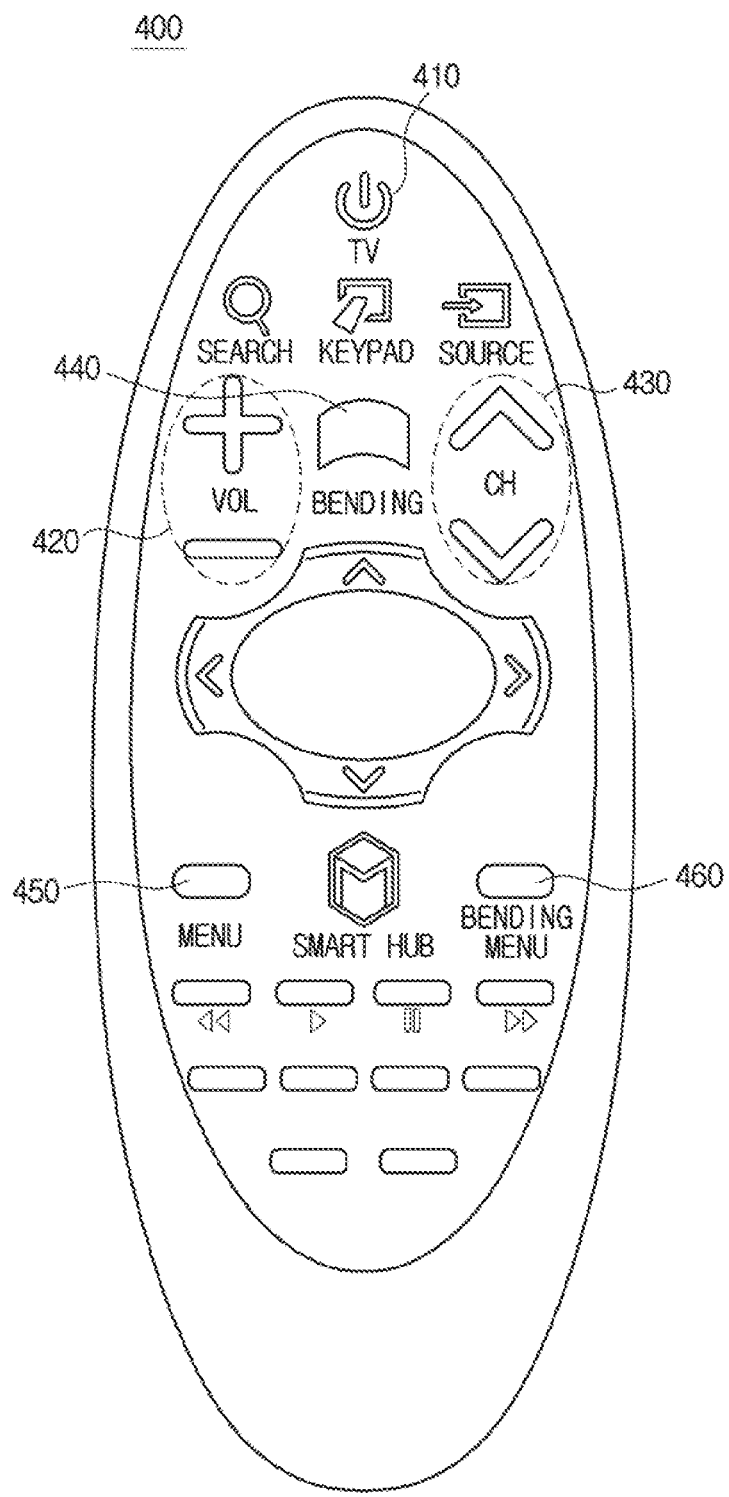
FIG. 4 is a view illustrating an input unit of a display apparatus according to an exemplary embodiment.

The input unit 400 may receive a variety of control commands from a user. FIG. 4 illustrates a case in which the input unit 400 is implemented by the remote controller (R). In this case, a plurality of buttons configured to receive a control command may be installed on a surface thereof. For example, a channel change button 430 configured to receive a channel change command, a volume adjustment button 420 configured to receive a volume adjustment command, a bending button 440 configured to receive a display panel curvature transformation command, a menu button 450 configured to adjust various settings, and a bending menu button 460 configured to set a curvature transformation.

The bending button 440 may be implemented by a toggle switch. When a user moves a toggle switch to one direction, a command to increase a curvature of the display 10 may be input, and when a user moves a toggle switch in the other direction, a command to decrease a curvature of the display 10 may be input.

The user may input a command to display the curvature transformation setting window via the bending menu button 460. The curvature transformation setting window of the display 10 may include an item for setting the display 10 state (e.g., a curved state or a flat state), whether to transform a curvature when booting, whether to transform a curvature when turning off the power, a curvature transformation speed, and setting a target curvature of the display 10.

The input unit 400 may include a plurality of buttons configured to receive a variety of control commands, e.g., changing the type of displayed image and changing the brightness of the displayed image. The input unit 400 may additionally include a button to allow a command, which is to generate the information area in the display 10, to be input. The information area generation command may be input by a combination of other buttons that are already provided. The input unit 400 may include a power button 410 configured to receive a command to turn on or turn off power. As a result of that, the input unit 400 may receive a command to apply a power (P) to the display apparatus 1. When a Power On signal is transmitted to the display apparatus 1 according to user input, the controller 100 may proceed a booting for a normal operation of the display apparatus 1.

According to an exemplary embodiment, the display apparatus 1 may include a driving device configured to transform the display 10 by changing the curvature of the display 10, as illustrated in FIGS. 3A and 3B. The driving device may include a first driving device 20a configured to transform the viewing area of the display 10 and a second driving device 20b configured to transform the background area and/or the information area of the display 10. Below, according to one or more exemplary embodiments, the first driving device 20a and a curvature transformation method of the viewing area by the first driving device 20a will be described with reference to FIGS. 5 to 10.

FIGS. 5 to 8 are exploded perspective views illustrating a display apparatus including a display panel composed of OLED according to one or more exemplary embodiments. According to one or more exemplary embodiments illustrated in FIGS. 5 to 8, a display 10 may include a display panel 10a formed by OLED panel, and a supporting panel 10b having a shape corresponding to the display panel 10a to support a rear surface of the display panel 10a.

Figure 5:
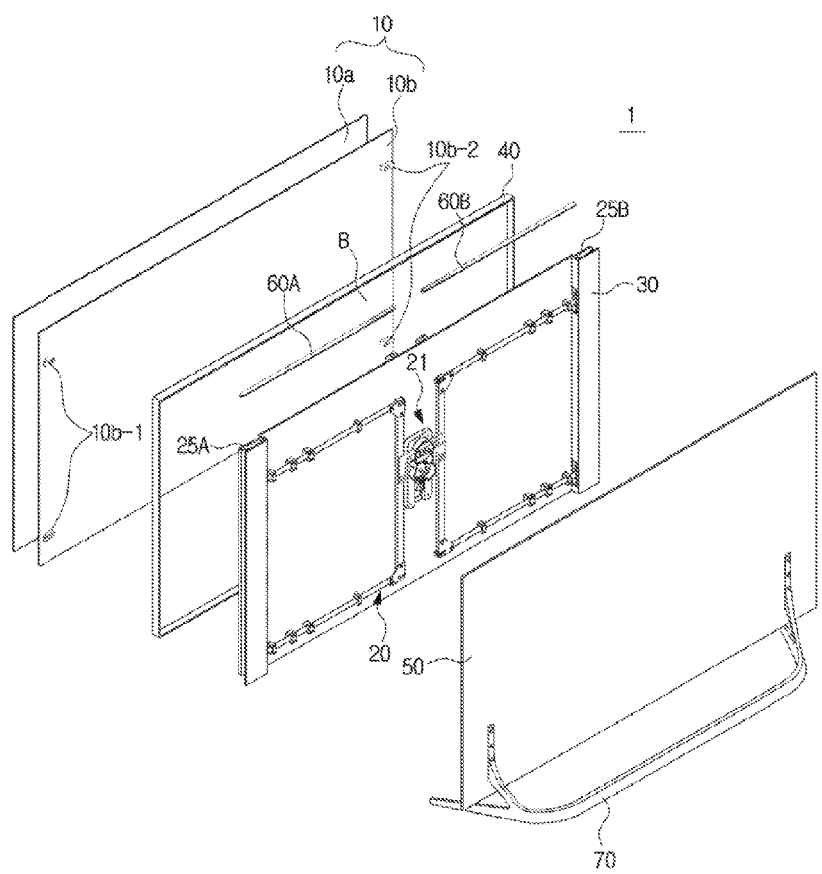
FIGS. 5 to 10 are exploded perspective views of a display apparatus according to one or more exemplary embodiments.
Figure 6:
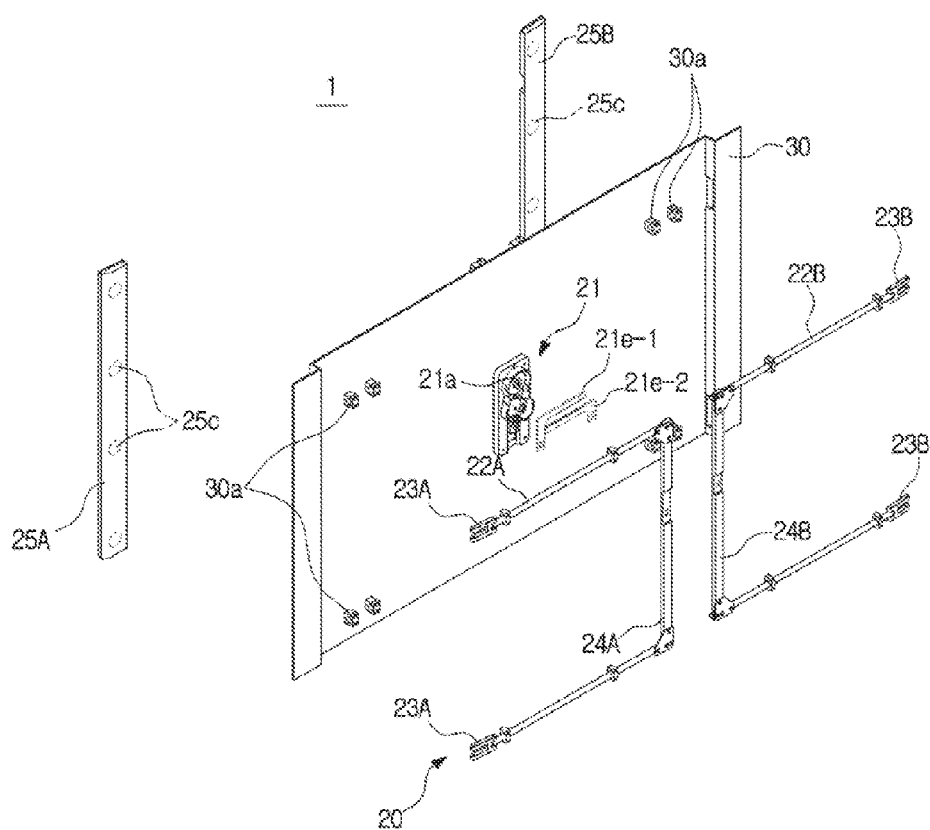

FIG. 5 is an exploded perspective view of a display apparatus according to an exemplary embodiment, and FIG. 6 is an exploded perspective view of a driving device of the display apparatus of FIG. 5. Referring to FIGS. 5 and 6, a viewing area of the display 10 may be fixed to a first base member 30. The first base member 30 may be formed in a square plate shape that corresponds to the display 10 to support a rear side of the display 10. According to an exemplary embodiment of the display apparatus 1, the display 10 may be fixed to the first base member 30 by at least one stud member 10b-1 and 10b-2 fixed to the supporting panel 10b. Accordingly, an end portion of the center of the display 10 may be prevented from being moved to the front side.

When the display 10 is transformed to be curved, the display apparatus 1 may include cover members 60A and 60B to cover between an upper end or a lower end of the display 10 and a side case 40 or a rear case 50. The cover members 60A and 60B may be formed in a plate shape having a long length in a left and right direction and may be stacked vertically.

The driving device 20 may be fixed to the first base member 30. The driving device 20 may transform the viewing area of the display 10 from a flat state into a curved state and from a curved state into a flat state. The driving device 20 may transform the display 10 into a curved state by moving opposite side end portions of the viewing area of the display 10 to the front side, or into a flat state corresponding to the first base member 30 by moving opposite side end portions of the viewing area of the display 10 to the rear side. The driving device 20 may be disposed on the center of the rear side the display 10. According to an exemplary embodiment, the driving device 20 may include a first driving unit 21 (e.g., first driver) configured to generate a driving force to symmetrically transform opposite sides of the display 10, a plurality of movement members 22A and 22B moved symmetrically in directions, which are opposite to each other, with respect to the first driving unit 21 by receiving the driving force from the first driving unit 21, and a plurality of rotation members 23A and 23B rotatably installed to be rotated according to the movement of the movement members 22A and 22B to move the opposite sides of the display 10 in the back and forth direction.

In this case, since the first driving unit 21 is fixed to the first base member 30, the display 10 may be transformed from a flat state into a curved state and from a curved state into a flat state with respect to the first base member 30.

The first driving unit 21 is disposed in the center of the rear side of the display 10 as mentioned above, and thus a distance from the first driving unit 21 to the opposite end portions of the viewing area of the display 10 may be practically the same. Accordingly, the driving force generated in the first driving unit 21 may be equally delivered to the opposite sides of the display 10, and thus the opposite end portions of the display 10 may be transformed to be symmetrical to each other with respect to the first driving unit 21.

As discussed above, the first driving unit 21 may be installed on the center of the rear surface of the first base member 30 so that the driving force may be stably delivered to an upper portion and a lower portion of the opposite sides of the display 10, but is not limited thereto. Therefore, the first driving unit 21 may be installed in an upper portion or a lower portion of the center of the first base member 30. The first driving unit 21 may be installed on the rear surface of the first base member 30 corresponding to the center of the viewing area of the display 10. For example, as illustrated in FIGS. 5 and 6, when the center of the viewing area corresponds to the center of the display 10, because the viewing area is provided between the background areas or the information areas, the first driving unit 21 may be provided in the center of the rear side of the first base member 30, as illustrated in FIGS. 5 and 6. When the center of the viewing area does not correspond to the center of the display 10, because the background area or the information area is provided on one side of the viewing area, the first driving unit 21 may be provided in the rear surface of the first base member 30 corresponding to the center of the viewing area without being provided in the center of the first base member 30.

The first driving unit 21 may include a driving motor 21a to generate a driving force, a pinion to convert a linear motion to a rotation motion, and a first rack 21e-1 and a second rack 21e-2 moved by the pinion. A speed of the driving force generated in the first driving unit 21 may be reduced and delivered to the pinion via a belt and a gear, and may rotate the pinion. Accordingly, the first rack 21e-1 and the second rack 21e-2 may be moved according to the rotation of the pinion.

The plurality of movement members 22A and 22B may include a first movement member 22A moving linearly in one side of a width direction of the display 10 by receiving the driving force from the first driving unit 21 and a second movement member 22B moving linearly in a direction that is opposite to the direction of the first movement member 22A by receiving the driving force from the first driving unit 21. A pair of the first movement members 22A may be vertically spaced apart from each other, and may be connected to each other via a first connection member 24A that is vertically extended to be moved together with each other. In addition, a pair of the second movement members 22B may be vertically spaced apart from each other, and may be connected to each other via a second connection member 24B that is vertically extended to be moved together with each other.

The pair of first movement members 22A may be connected to the first rack 21e-1 by the first connection member 24A and moved together with the first rack 21e-1, and the a pair of second movement members 22B may be connected to the second rack 21e-2 by the second connection member 24B and moved together with the second rack 21e-2.

A plurality of movement guides 30a may be disposed in the first base member 30 to allow the first movement member 22A and the second movement member 22B to be movable. The movement guide 30a may guide a horizontal movement of the first movement member 22A and the second movement member 22B. According to one or more exemplary embodiments, four pair of movement guides 30a may be provided in the first base member 30 so that two first movement members 22A and two second movement members 22B may be movably supported by a pair of movement guides 30a, respectively.

The plurality of rotation members 23A and 23B may include a first rotation member 23A and a second rotation member 23B. Because one end of the first rotation member 23A is rotatably installed in the first movement member 22A and the other end of the first rotation member 23A is rotatably installed in a first side end of the display 10, the first rotation member 23A may be rotated while being interlocked with the movement of the first movement member 22A, to move the first side end of the display 10 in the back and forth direction. Since one end of the second rotation member 23B is rotatably installed in the second movement member 22B, and the other end of the second rotation member 23B is rotatably installed in a second side end of the display 10 that is placed on an opposite side to the first side end, the second rotation member 23B may be rotated while being interlocked with the movement of the second movement member 22B, to move the second side end of the display 10 in the back and forth direction.

A pair of first hinge members 10b-1 may be installed to be vertically spaced apart from each other on one side of rear surface of the display 10 to allow the other end of the a pair of the first rotation members 23A to be rotatable. A pair of second hinge members 10b-2 may be installed to be vertically spaced apart from each other on the other side of rear surface of the display 10 to allow the other end of the a pair of the second rotation members 23B to be rotatable.

Figure 7:
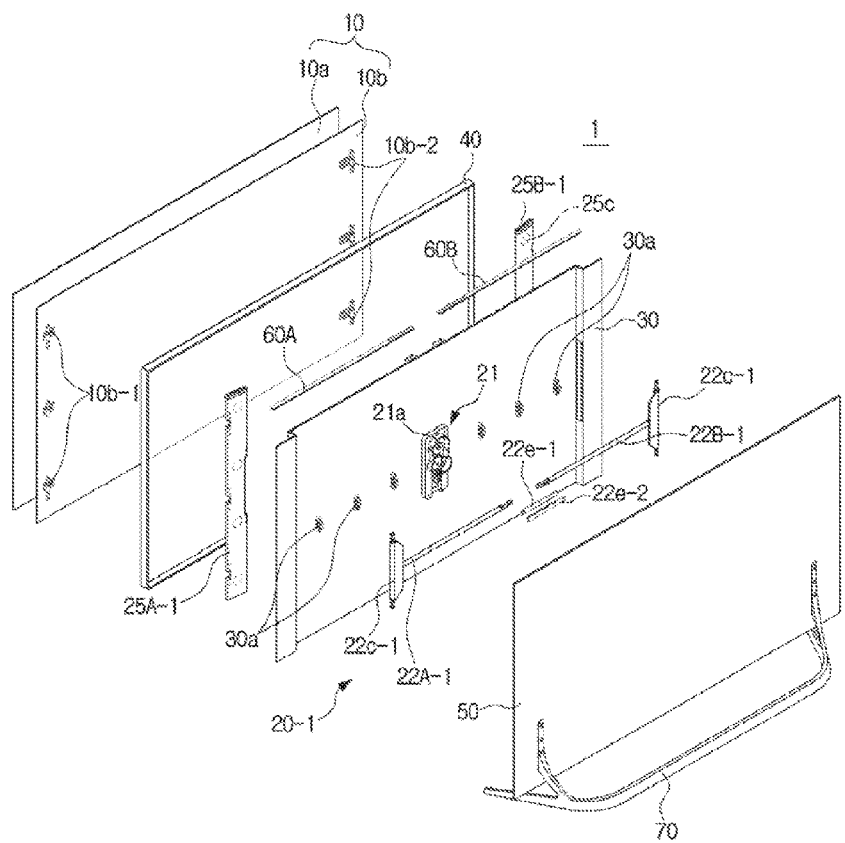

FIG. 7 is an exploded perspective view of a display apparatus according to an exemplary embodiment.

According to an exemplary embodiment of a display apparatus 1, a first driving device 20-1 may include a single first movement member and a single second movement member. One end of the first movement member 22A-1 may be directly connected to the first rack 22e-1 and the other end of the first movement member 22A-1 may be rotatably installed in the first base member 30. One end of the second movement member 22B-1 may be directly connected to the second rack 22e-2 and the other end of the second movement member 22B-1 may be rotatably installed in the first base member 30.

On each of the other end of the first movement member 22A-1 and the second movement member 22B-1, a hinge unit 22c-1 that is vertically extended to have a certain width and rotatably installed in the first base member 30 may be provided.

Figure 8:
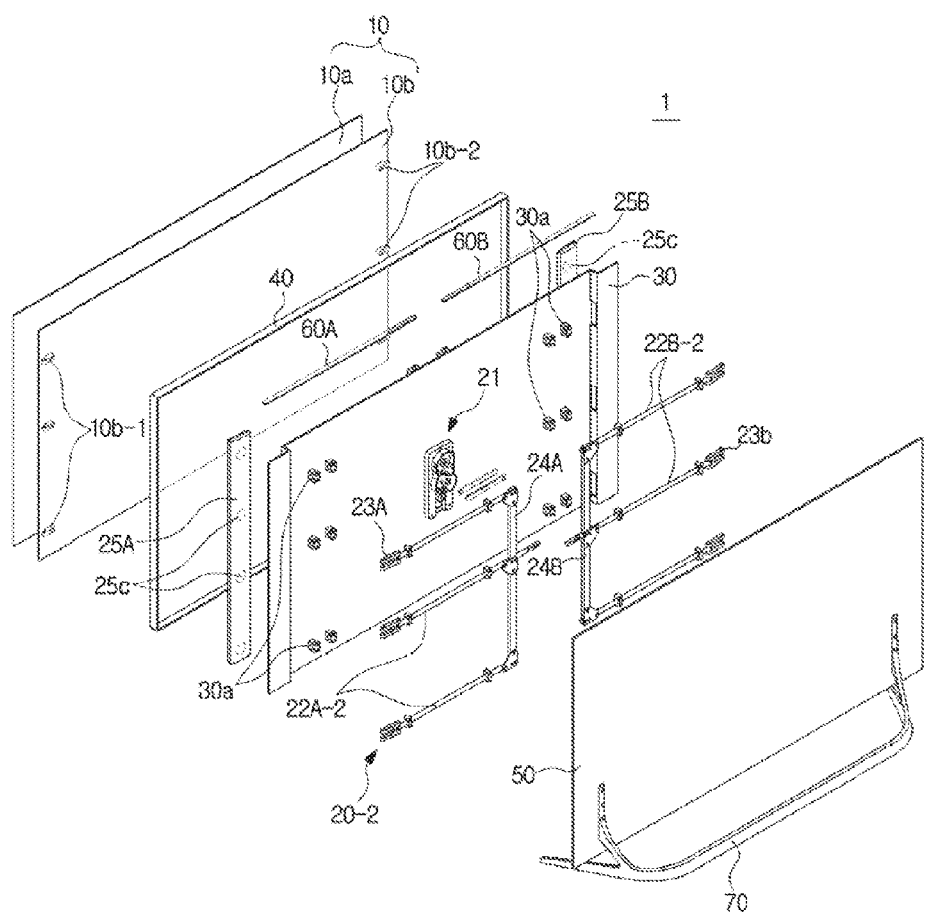

FIG. 8 is an exploded perspective view of a display apparatus according to an exemplary embodiment.

As illustrated in FIG. 8, a first driving device 20-2 may include three first movement members 22A-2 vertically spaced apart from each other and connected to each other via a first connection member 24A, and three second movement members 22B-2 vertically spaced apart from each other and connected to each other via a second connection member 24B.

According to an exemplary embodiment of FIG. 8, an upper portion, a lower portion, and a middle portion of opposite sides of the display 10 may simultaneously receive a force via the first movement member 22A-2 and the second movement member 22B-2. Therefore, according to an exemplary embodiment, the first driving device 20-2 may be capable of more stably transforming the display 10 than the first driving device having one pair or two pair of the first movement members and the second movement members.

As described above, the driving device may include the various first movement members and the second movement members. The number of the first movement members and the second movement members may be determined according to the type of the display panel 10a.

Figure 9:
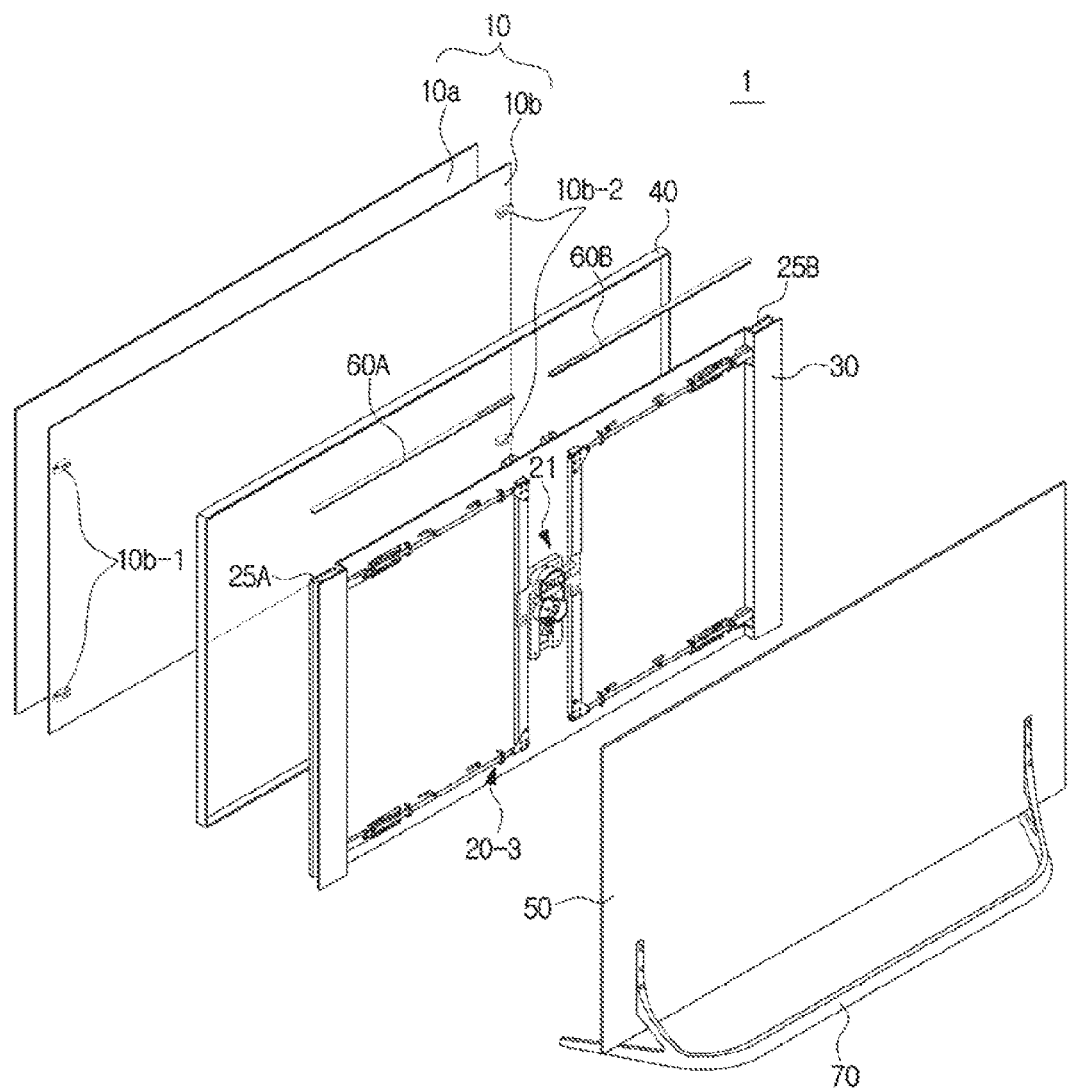
Figure 10:
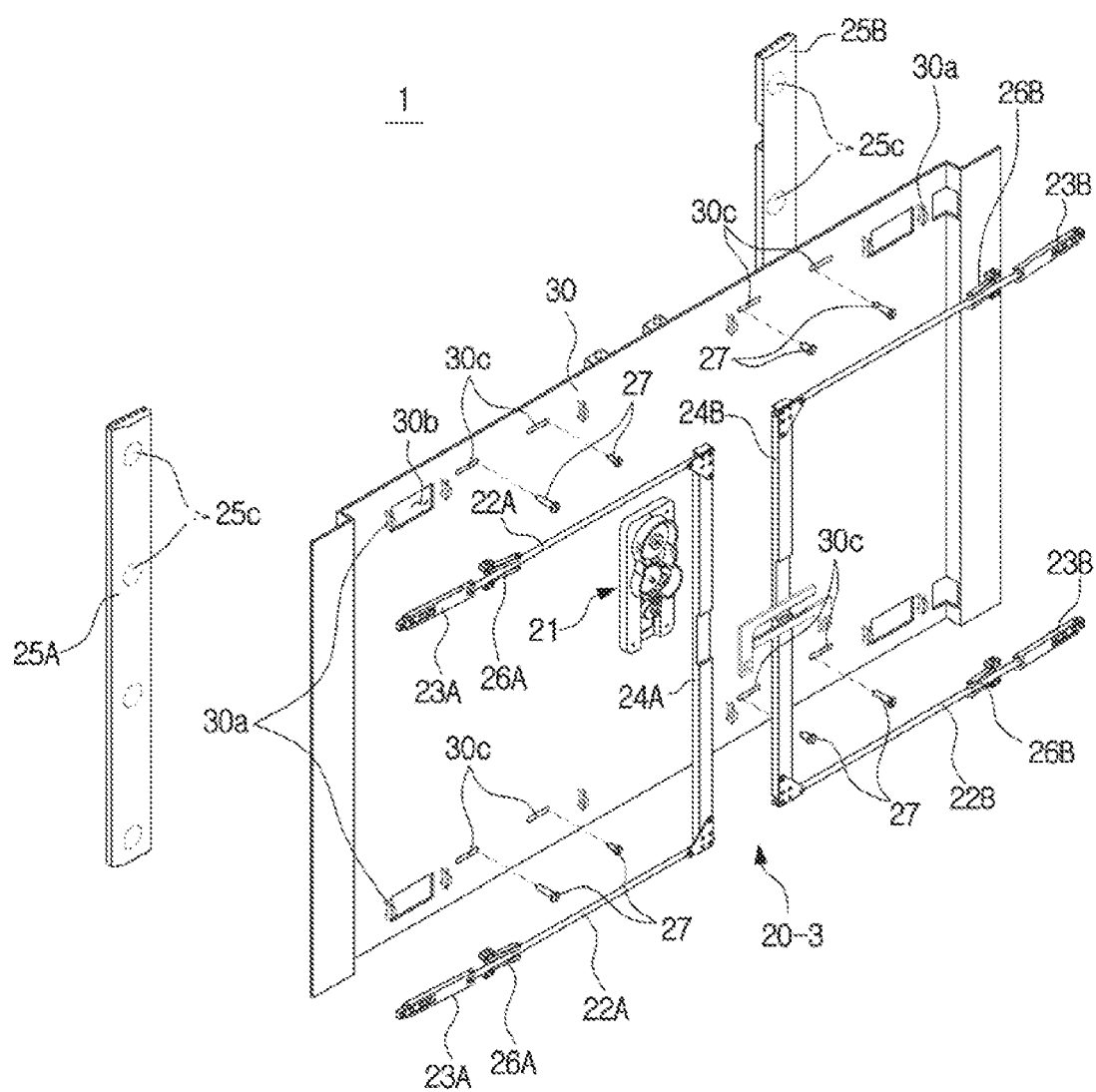

FIGS. 9 and 10 are views illustrating a display apparatus including a plurality of stoppers according to an exemplary embodiment. FIG. 9 is an exploded perspective view of the display apparatus including a plurality of stoppers, and FIG. 10 is an exploded perspective view of a driving device of the display apparatus including a plurality of stoppers according to an exemplary embodiment.

Referring to FIGS. 9 and 10, a first driving device 20-3 may include a plurality of movement members 22A and 22B, a plurality of rotation member 23A and 23B, a first connection member 24A, a second connection member 24B, and a first driving unit 21.

In addition, the first driving device 20-3 may include a plurality of stoppers 26A, 26B and 27 that are connected to the rear surface of the display 10 and configured to limit the transformation of the display 10 so that the transformation of the display 10 may be precisely performed to have a setting curvature.

The stopper 26A, 26B, and 27 may include a plurality of rotation stoppers 26A and 26B that are rotated according to the transformation of the display 10 and a plurality of fixation stoppers 27 fixed to the rear surface of the display 10.

Because one end of the rotation stopper 26A and 26B is rotatably installed in the first movement member 22A and the second movement member 22B, and the other end of the rotation stopper 26A and 26B is rotatably installed on the rear surface of the display 10 via a through hole 30b provided in the first base member 30, the rotation stopper 26A and 26B may be rotated according to the transformation of the display 10.

A front end of the fixation stopper 27 may be fixed to the rear surface of the display 10, and a rear end of the fixation stopper 27 may be protruded to a rear side of the first base member 30 by being passed through a locking hole 30c provided in the first base member 30. The rear end of the fixation stopper 27 may be supported by being locked to a locking hole 30c of the first base member 30 when the display 10 is transformed into a curved state.

As for the above-mentioned fixation stopper 27, the rear end of the fixation stopper 27 may be moved to a width direction of the display 10 according to the transformation of the display 10 and thus the locking hole 30c may be extended to correspond to the movement of the rear end of the fixation stopper 27.

Four rotation stoppers 26A and 26B may be provided and one end thereof may be rotatably installed in two first movement members 22A and two second movement members 22B, respectively, and the rotation stoppers 26A and 26B may be installed in a position adjacent to an end portion in which the above-mentioned first rotation member 25A and second rotation member 25B are installed.

In addition, eight fixation stoppers 27 may be provided and four fixation stoppers 27 may be installed to be spaced apart from each other in an upper portion and a lower portion of the rear surface of the display 10, respectively.

A length of the four fixation stoppers 27 installed in the center of the display 10 may be shorter than that of the other four fixation stoppers 27. Accordingly, according to the transformation of the display 10, the opposite ends of the display 10 may be relatively more moved than the center of the display 10 in the back and forth direction.

When the display 10 is the flat state, the rotation stopper 26A and 26B may be adjacent to the movement member 22A and 22B, and the rear end of the fixation stopper 27 may be protruded to the rear side from the first base member 30 to maintain to be spaced apart.

As the display 10 is transformed from the flat state into the curved state, the rotation stopper 26A and 26B may be rotated and the fixation stopper 27 may be moved to the front side and locked to the locking hole adjacent unit of the first base member 30.

Therefore, by adjusting a length of the rotation stopper 26A and 26B and the fixation stopper 27, a curvature of each part of the transformed display 10 may be precisely adjusted.

According to one or more exemplary embodiments, the first driving device may transform the viewing area of the display 10 into the curved state or the flat state by adjusting the curvature of the display 10. In a state in which the background area or the information area is formed on any one side or opposite sides of the viewing area, when the background area or the information area is transformed into the curved state together with the viewing area, the background area or the information area may interrupt viewing of the viewing area. In order to prevent the background area or the information area from interrupting viewing of the viewing area by transforming the background area or the information area into the curved state or the flat state having less curvature than that of the viewing area, the display apparatus may include a second driving device configured to change a curvature of the background area or the information area so that the curvature of background area or the information area is different from a curvature of the viewing area. Below, a detailed description of the second driving device will be described.

Figure 11:
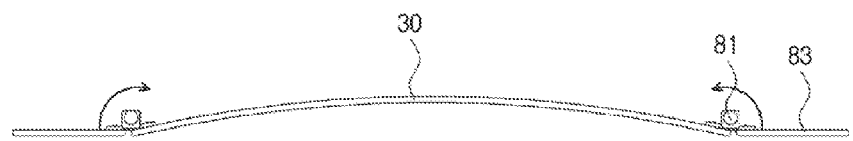
FIG. 11 is a view illustrating an operation of a second driving device according to an exemplary embodiment.
Figure 12:
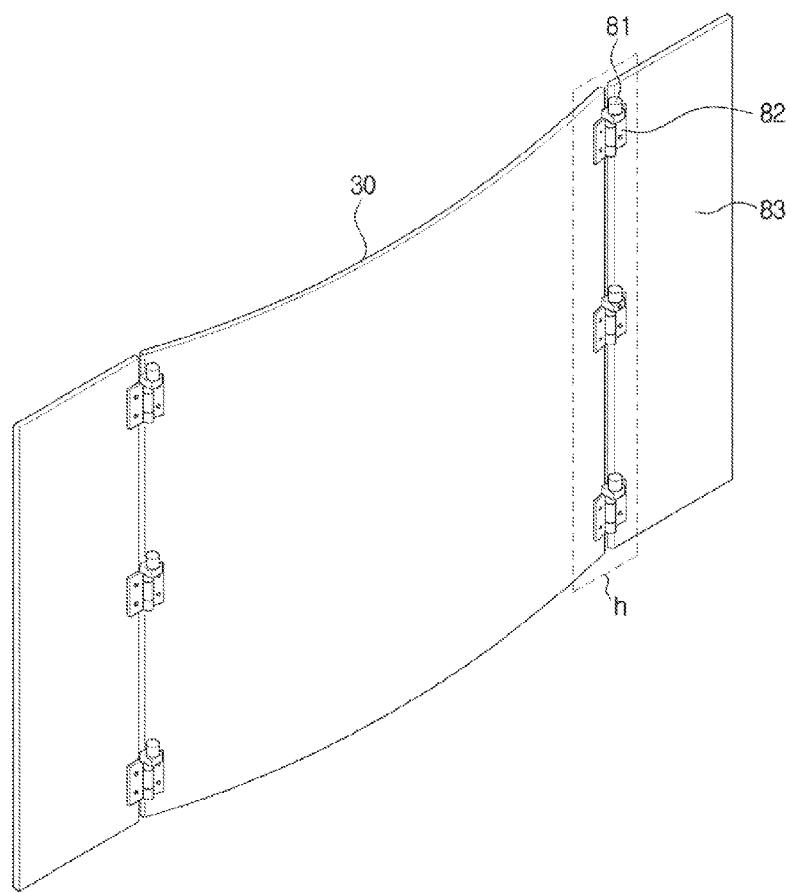
FIG. 12 is a view illustrating a second driving device according to an exemplary embodiment.

FIG. 11 is a view illustrating an operation of a second driving device according to one or more exemplary embodiments and FIG. 12 is a view illustrating a second driving device according to an exemplary embodiment. For the convenience of the description, in FIG. 12, the first driving device is omitted, and the second driving device is illustrated.

Referring to FIGS. 11 and 12, a background area or an information area of a display 10 may be fixed to a second base member 83 hinge-coupled to a first base member 30. Below, a case in which the information area is formed on opposite sides of the viewing area will be described as an example as illustrated in FIGS. 11 and 12. A structure and an operation of two second driving devices provided in the second base member corresponding to the information area may be the same, and thus, a single second driving device will be described.

The second base member may be formed in a square plate shape corresponding to the information area of the display 10 to support a rear side of the display 10 together with the first base member.

The second driving device may transform the information area of the display 10 from a flat state into a curved state and from a curved state into a flat state. The second driving device may move one end portion of the information area of the display 10, which is not connected to the viewing area, to the front side so that the display 10 is transformed into the curved state or the second driving device may move one end portion of the background area of the display 10 to the rear side so that the display 10 is transformed into the flat state corresponding the second base member.

According to an exemplary embodiment, the second driving device may include a second driving unit 81 configured to generate a driving force to transform one side end of the information area of the display 10, and a plurality of rotation members 82 configured to move one side of the information area of the display 10 in the back and forth direction by receiving the driving force from the second driving unit. The second driving unit and the rotation member may be provided in an area (h) in which the first base member and the second base member are hinge-coupled to each other. As illustrated in FIG. 11, the second driving unit may generate a driving force that enables the rotation member to move the information area to the rear side, and may transform the information area into the flat state.

According to one or more exemplary embodiments, the display apparatus may include the first driving device and the second driving device configured to transform the curvature of the viewing area and the information area so that the curvature of the viewing area of the display 10 and the curvature of the information area of the display 10 are different from each other. For example, the first driving device may provide an immersive sense to a user by transforming the viewing area into the curved state, and the second driving device may prevent the information area from interrupting user's viewing of the viewing area by transforming the information area into the flat state.

When the information area is not formed in the display 10 and an entire screen is the viewing area, the controller 100 may operate the first driving device to transform the entire of the display 10 into the curved state when receiving a bending command via the input unit from a user. When the first driving device is installed in the center of the rear side of the display 10 to transform the curvature of the viewing area, as illustrated in FIGS. 5 to 10, the display 10 may be transformed to have a desired curvature by only driving the first driving device. Since the movement member of the first driving device is installed in opposite end portions of the viewing area without being installed in opposite end portions of the display 10, a degree of bending of an area, to which a force is not directly applied by the movement of the first driving device, that is an area corresponding to the information area, may be slightly small. In this case, the controller 100 may transform the display 10 into a curved state having the same curvature on an overall of the display 10 by driving the second driving device together with the first driving device. When inputting a bending command, control information of the first driving device and the second driving device that enables the display 10 to have the same curvature on the overall thereof may be stored in the memory in advance.

Figure 13:
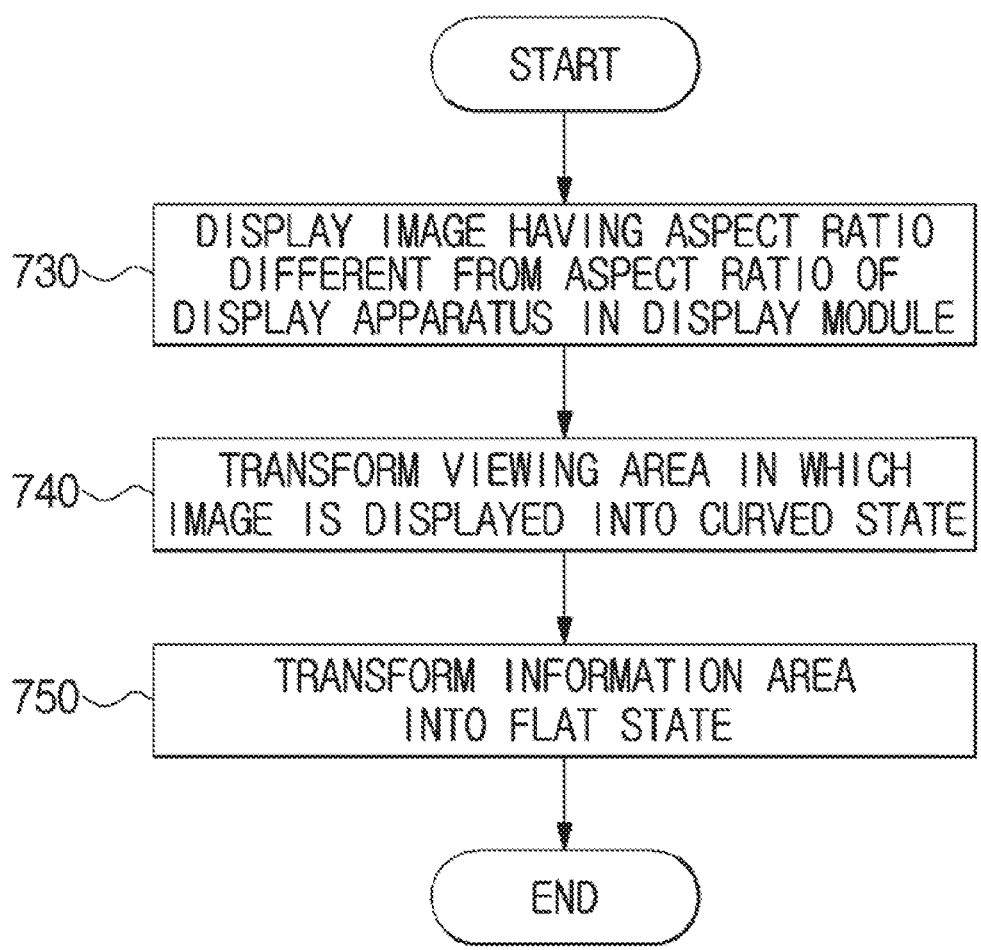
FIGS. 13 and 14 are flowcharts illustrating a control method of a display apparatus according to an exemplary embodiment.
Figure 14:
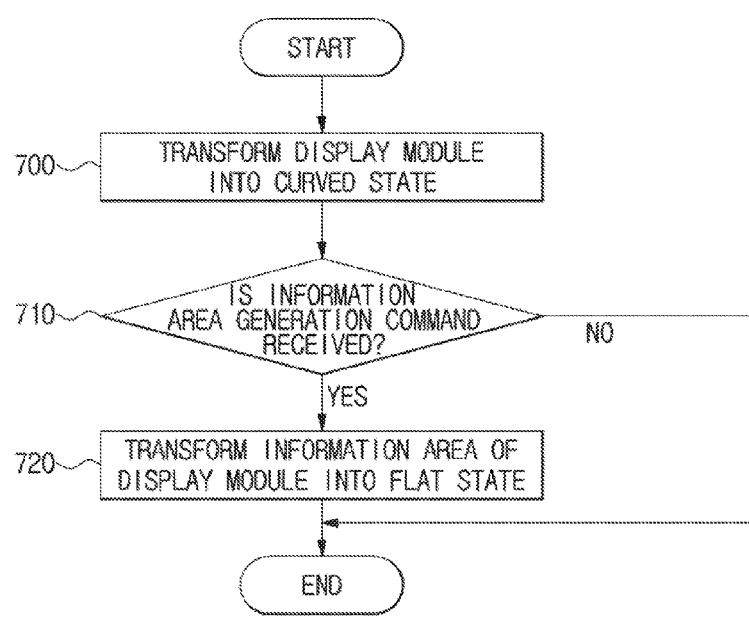

FIGS. 13 and 14 are flowcharts illustrating a control method of a display apparatus according to an exemplary embodiment. As illustrated in FIG. 13, when an image having an aspect ratio different from an aspect ratio of the display apparatus is displayed on the display (730), the controller may transform the viewing area in which the image is displayed into the curved state (740), and may transform the background area or the information area into the flat state (750).

While the display 10 is maintained in the flat state, the background area may be formed in addition to the viewing area in which image information is displayed since image information having an aspect ratio different from an aspect ratio of the display 10 is displayed. When a bending command is input, the controller 100 may transform the viewing area into a curved state having a predetermined curvature by driving the first driving device while transforming the background area to a state having less curvature than that of the viewing area by driving the second driving device. For example, when image information having an aspect ratio of 16:9 is displayed on a display apparatus having an aspect ratio of 21:9, a background area having an aspect ratio of 2.5:9 may be formed on opposite sides of the viewing area having an aspect ratio of 16:9. In this case, when a bending command is input, the controller 100 may transform the viewing area into the curved state and the background area into the flat state by driving the first driving device disposed on the rear side of the viewing area and the second driving device disposed on the rear side of each of the background area. That is, the first driving device may transform the viewing area of the display 10 into the curved state by moving opposite sides of the first base member to the front side, and the second driving device may transform the background area of the display 10 into the flat state by moving opposite sides of the first base member to the rear side.

According to an exemplary embodiment, without driving the first driving device and the second driving device at the same time, the background area of the display 10 may be transformed into the flat state by driving the second driving device after transforming the overall of the display 10 into the curved state by first driving the first driving device.

While the display 10 is maintained in the flat state without the input of the bending command, when the background area is formed in addition to the viewing area, in which image information is displayed, since an image having an aspect ratio different from the aspect ratio of the display 10 is displayed, the controller 100 may automatically drive the first driving device and the second driving device, as mentioned above. The background area of the display 10 may be transformed into the flat state by driving the second driving device after transforming the overall of the display 10 into the curved state by first driving the first driving device.

According to an exemplary embodiment, while the display 10 is maintained in the curved state, when the background area is formed in addition to the viewing area, in which image information is displayed, if an image having an aspect ratio different from the aspect ratio of the display 10 is displayed, the controller 100 may transform the background area into a state having a curvature that is less than the viewing area by driving the second driving device. For example, when image information having an aspect ratio of 16:9 is displayed on a display apparatus having an aspect ratio of 21:9, a background area having an aspect ratio of 2.5:9 may be formed on opposite sides of the viewing area having an aspect ratio of 16:9. The controller 100 may transform the background area into the flat state by driving the second driving device disposed on the rear side of each of the background area. That is, when the background area is formed, the second driving device may transform the background area of the display 10 into the flat state by moving the second base member to the rear side.

As illustrated in FIG. 14, the controller may transform the display into the curved state (700), and when a command to generate information area is received (710), the controller may transform the information area of the display into the flat state (720).

While the display 10 is maintained in the curved state, when the command to generate information area is input, the controller 100 may transform the information area into a state having a curvature that is less than a curvature of the viewing area by driving the second driving device.

For example, when image information area is formed on an area having an aspect ratio of 2.5:9, which is on opposite sides of the display apparatus having an aspect ratio of 21:9, if an information area generation command is input, the controller 100 may transform the information area into the flat state by driving the second driving device disposed on the rear side of each of the information area. That is, when the information area is formed, the second driving device may transform the information area of the display 10 into the flat state by moving the second base member to the rear side.

Control information for driving of the second driving device may be pre-stored in the memory to transform the background area or the information area of the display 10 into the flat state or the curved state having less curvature than that of the viewing area.

While the display 10 is maintained in the flat state, when a command to generate information area in the display is input, in addition to the viewing area in which image information is displayed, the information area may be formed in the display 10. In this case, when a bending command is input, the controller 100 may transform the viewing area into a curved state having a predetermined curvature by driving the first driving device while transforming the information area into a state having less curvature than that of the viewing area by driving the second driving device. For example, in a state in which an information area is formed on an area having an aspect ratio of 2.5:9, which is on opposite sides of the display apparatus having an aspect ratio of 21:9, if an information area generation command is input, when a command is input, the controller 100 may transform the viewing area into the curved state and the information area into the flat state by driving the first driving device disposed on the rear side of the viewing area and the second driving device disposed on the rear side of the information area, respectively. That is, the first driving device may transform the viewing area of the display 10 into the curved state by moving the opposite sides of the first base member to the front side, and the second driving device may transform the information area of the display 10 into the flat state by moving the opposite sides of the second base member to the rear side. Alternatively, without driving the first driving device and the second driving device at the same time, the information area of the display 10 may be transformed into the flat state by driving the second driving device after transforming the display 10 into the curved state by first driving the first driving device.

While the display 10 is maintained in the flat state without the input of the bending command, when the information area is formed, in addition to the viewing area in which image information is displayed in the display 10, if the information area generation command is input to the display, the controller 100 may automatically drive the first driving device and the second driving device, as described above. The information area of the display 10 may be transformed into the flat state by driving the second driving device after transforming the overall of the display 10 into the curved state by first driving the first driving device.

While the display 10 is maintained in the flat state, when a command to generate information area is input in the display, the information area may be formed, in addition to the viewing area in which image information is displayed, in the display 10. When a bending command is input, the controller 100 may transform the viewing area into a curved state having a predetermined curvature by driving the first driving device while transforming the information area into a state having less curvature than that of the viewing area by driving the second driving device. For example, in a state in which an information area is formed on an area having an aspect ratio of 2.5:9, which is opposite sides of the display apparatus having an aspect ratio of 21:9, if an information area generation command is input, when a command is input, the controller 100 may transform the viewing area into the curved state and the information area into the flat state by driving the first driving device disposed on the rear side of the viewing area and the second driving device disposed on the rear side of the information area, respectively. That is, the first driving device may transform the viewing area of the display 10 into the curved state by moving the opposite sides of the first base member to the front side, and the second driving device may transform the information area of the display 10 into the flat state by moving the opposite sides of the second base member to the rear side. Alternatively, without driving the first driving device and the second driving device at the same time, the information area of the display 10 may be transformed into the flat state by driving the second driving device after transforming the overall of the display 10 into the curved state by firstly driving the first driving device.

While the display 10 is maintained in the flat state without the input of the bending command, when the information area, is formed, in addition to the viewing area in which image information is displayed in the display 10, if the information area generation command is input to the display, the controller 100 may automatically drive the first driving device and the second driving device, as mentioned above. In this case, the information area of the display 10 may be transformed into the flat state by driving the second driving device after transforming the overall of the display 10 into the curved state by first driving the first driving device.

According to one or more exemplary embodiments, by allowing a curvature of a viewing area and a curvature of a background area to be different from each other, interruption of a user's immersive sense in the viewing area may be prevented.

Although one or more exemplary embodiments have been shown and described, it should be appreciated by those skilled in the art that changes may be made to the exemplary embodiments without departing from the principles and spirit of the present disclosure, the scope of which is defined in the claims and their equivalents.

What is claimed is:
1. A display apparatus comprising:
a display configured to display a broadcast image; and
a driving device configured to change a curvature of the display,
wherein the driving device is configured to control a curvature of a viewing area of the display, in which the broadcast image is displayed, and a curvature of a background area of the display, in which the broadcast image is not displayed, to be different from each other, and wherein the driving device is further configured to, in response to an image displayed in the viewing area having an aspect ratio different from an aspect ratio of the display apparatus, change the curvature of the display so that the curvature of the background area of the display is less than the curvature of the viewing area.

2. The display apparatus of claim 1, wherein the driving device is further configured to maintain the viewing area of the display in a curved state and transform the background area into a flat state.

3. The display apparatus of claim 1, wherein the driving device is further configured to transform the viewing area of the display into a curved state and maintain the background area in a flat state.

4. The display apparatus of claim 1, wherein the driving device is further configured to change the curvature of the display so that the curvature of the background area of the display is less than the curvature of the viewing area.

5. The display apparatus of claim 1, wherein the driving device is further configured to change the curvature of the display so that a curvature of an information area is less than a curvature of the viewing area when the information area is formed in the background area of the display.

6. The display apparatus of claim 1, further comprising:
an input interface configured to input a command to generate an information area in the background area of the display,
wherein the driving device is further configured to, in response to a command to generate the information area being input, change the curvature of the display so that the curvature of the background area is less than the curvature of the viewing area.

7. The display apparatus of claim 1, wherein the driving device further comprises:
a first base member provided at a rear side of the viewing area of the display;
a second base member provided at a rear side of the background area of the display; and
a hinge member configured to couple the first base member and the second base member such that a curvature of the first base member is controlled to be different than a curvature of the second base member.

8. A display apparatus comprising:
a display; and
a driving device configured to change a curvature of the display,
wherein the driving device is configured to control a curvature of a viewing area of the display and a curvature of a background area of the display to be different from each other, and
wherein the driving device is further configured to, in response to an image displayed in the viewing area having an aspect ratio different from an aspect ratio of the display apparatus, change the curvature of the display so that the curvature of the background area of the display is less than the curvature of the viewing area.

9. The display apparatus of claim 1, wherein the background area of the display is provided on at least one side of the viewing area.

10. The display apparatus of claim 1, wherein the driving device comprises:

a first driving device configured to change the curvature of the viewing area of the display; and
at least one second driving device configured to change a curvature of an information area of the display.

11. The display apparatus of claim 10, wherein the first driving device comprises:
a first base member provided in a rear side of the viewing area of the display;
a first driver provided in the first base member and configured to generate a driving force;
a plurality of movement members configured to be moved in opposite directions by the first driver; and
a plurality of rotation members configured to be rotated by the movement members and to move opposite sides of the viewing area in a first direction and a second direction.

12. The display apparatus of claim 10, wherein the at least one second driving device comprises:
a second base member provided in a rear side of the information area of the display;
a second driver configured to generate a driving force to move the second base member; and
a rotation member provided in the second base member and configured to be rotated by the second driver and to move one side of the information area in a first direction and a second direction.

13. A control method of a display apparatus, the control method comprising:
transforming a viewing area of a display, in which a broadcast image is displayed, into a curved state;
transforming an information area of the display, in which the broadcast image is not displayed, so that a curvature of the information area of the display is less than a curvature of the viewing area; and
displaying in the viewing area an image having an aspect ratio that is different from an aspect ratio of the display apparatus,
wherein the transforming the viewing area of the display into the curved state comprises transforming the viewing area of the display into the curved state in response to an image being displayed in the viewing area having an aspect ratio that is different from an aspect ratio of the display apparatus.

14. The control method of claim 13,
wherein the transforming the viewing area of the display into the curved state comprises receiving an input to transform the display into the curved state and transforming the viewing area of the display into the curved state according to the received input.

15. The control method of claim 13 further comprising:
receiving an input to generate the information area in the display.

16. The control method of claim 15,
wherein the transforming the viewing area of the display into the curved state comprises transforming the viewing area of the display into the curved state in response to the input to generate the information area being received.

17. The control method of claim 15,
wherein the transforming the information area comprises transforming the information area of the display into a flat state in response to the input to generate the information area being received.

18. The control method of claim 13,
wherein the transforming the information area comprises transforming the information area of the display into a flat state.

19. The control method of claim 13,
wherein the transforming the information area comprises transforming the information area of the display into a flat state in response to an image being displayed in the viewing area having an aspect ratio that is different than an aspect ratio of the display apparatus.

20. The control method of claim 13, wherein the transforming the information area comprises generating a driving force to control a curvature of a first base member, which is provided at a rear side of the viewing area of the display, to be different than a curvature of a second base member, which is provided at a rear side of the information area of the display, wherein the second base member is coupled to the first base member by a hinge member.

* * * * *